US006561143B2

(12) United States Patent
Holtzman

(10) Patent No.: US 6,561,143 B2
(45) Date of Patent: May 13, 2003

(54) ENGINE INDUCTION VALVE WITH REDUCED BACKFLOW

(76) Inventor: Barry L Holtzman, 3907 Evergreen Rd., Eagle River, WI (US) 54521

( * ) Notice: Subject to any disclaimer, the term of this patent is extended or adjusted under 35 U.S.C. 154(b) by 96 days.

(21) Appl. No.: 09/948,308

(22) Filed: Sep. 6, 2001

(65) Prior Publication Data

US 2003/0041819 A1 Mar. 6, 2003

(51) Int. Cl.⁷ .............................. F02B 33/04
(52) U.S. Cl. ............... 123/73 V; 137/512.15; 137/855; 137/543.15
(58) Field of Search ............ 123/73 V; 137/855, 137/512.1, 857, 512.15, 854, 543.15

(56) References Cited

U.S. PATENT DOCUMENTS

| | | | |
|---|---|---|---|
| 1,555,192 A | 7/1925 | Dennedy | 417/539 |
| 2,612,882 A | 10/1952 | Kiekhaefer | 123/73 |
| 2,669,979 A | 2/1954 | Kiekhaefer | 123/73 |
| 2,689,552 A | 9/1954 | Kiekhaefer | 123/73 |
| 3,008,459 A | 11/1961 | Kaufman | 123/73 |
| 3,911,949 A | * 10/1975 | Hilden et al. | 137/854 |
| 4,076,047 A | 2/1978 | Akahori | 137/856 |
| 4,408,579 A | 10/1983 | Kusche | 123/73 |
| 4,969,424 A | * 11/1990 | Klomp | 123/73 V |
| 5,014,739 A | 5/1991 | Csaszar | 137/515.15 |
| 5,601,112 A | 2/1997 | Sekiye et al. | 137/512.15 |
| 5,636,658 A | 6/1997 | Powell | 137/512.1 |
| 5,655,898 A | 8/1997 | Hashimoto et al. | 417/569 |

* cited by examiner

Primary Examiner—Tony M. Argenbright
Assistant Examiner—Katrina B. Harris

(57) ABSTRACT

This invention is an effective engine induction valve which provides a decrease in engine blowback while maintaining engine power. This valve uses a moveable member made from a heat-setting material, this member being bent into an elliptical curve when the member is in the closed position. This elliptical curve has an included angle at the edge of the member which opens toward the engine, this orientation being beneficial in reducing blowback. Using springs to limit the force attaching the moveable member to the valve body prevents unwanted buckling of this member when exposed to elevated temperature and fuel. An embodiment is described which provides a valve with a uniform frequency response at various operating conditions, especially different temperatures.

20 Claims, 6 Drawing Sheets

ENGINE INDUCTION VALVE WITH REDUCED BACKFLOW

BACKGROUND

1. Field of Invention

This invention is an improved engine induction one-way valve to control intake mass flow in primarily two-stroke cycle engines. In one embodiment of this invention, a reed embodiment, the moveable sealing member is a reed; in another embodiment, a poppet embodiment, it is a spring-loaded curved plate. The moveable sealing member is bent against a curved seat preferably being a segment of an ellipse and having a relatively small average radius of curvature. The convex side of this curve always faces the incoming flow to the engine thereby presenting an aerodynamic surface for this flow; the concave side always faces the engine to minimize backflow. In order to minimize the pop-off pressure of this valve which would normally be associated with bending to this small radius of curvature, the moveable sealing member is made from a material which stress relieves and takes a set when exposed to a process which usually includes elevated temperature.

2. Description of Prior Art

Induction valves have been used extensively to control mass (air and sometimes fuel) flow into an engine, primarily two-stroke cycle engines. These two-stroke cycle engines are normally crankcase-scavenged wherein the reciprocating motion of the piston in the cylinder changes the effective crankcase volume, thus causing a pumping action. When the cylinder piston rises in its cylinder, effective crankcase volume increases creating a vacuum which causes a mass flow into the crankcase; the descending motion of the piston on the power stroke decreases crankcase volume causing an increase in crankcase pressure, this increase being used to force mass into the engine cylinder for combustion. This increase in crankcase pressure also tends to force mass flow out of the crankcase through the induction tract through which it just entered, this reverse mass flow being called backflow, reversion, or blowback. It is desirable to minimize this backflow for engine power, emissions, and fuel economy considerations.

Several methods of controlling this reverse flow have been employed; one method uses a reed valve placed in the induction tract. The reed valve design which has gained wide acceptance for crankcase-scavenged two-stroke cycle engines uses reeds firmly clamped to a reed cage, the reeds and reed cage looking much like a pup tent with the apex of the tent facing the engine. FIG. 1 of applicant's co-pending application 09/812337 shows a commonly used reed assembly. The included angle of a reed valve is defined herein as the angle between two lines tangent to the reed ends when in the closed position. This angle by choice will be 180 degrees or less. Typically, this included angle in a conventional reed valve is in a range of 60 to 120 degrees, with the open side of the included angle facing away from the engine (toward the throttle) and its apex pointing toward the engine. Therefore, in the case of a conventional reed valve, the included angle is the angle between the two panels of the "tent" with the floor of the tent being on the side away from the engine and the peak of the tent pointing toward the engine.

The reed cage contains usually three or four openings in each side of the "tent" with reed petals which rest against seats formed into the tent, thereby closing the valve. The reed petals bend away from the seats to open the valve upon application of an opening pressure. The seats are normally flat and therefore the reeds in the closed position resting against the seats are flat. The reed petals are usually made from stainless steel, fiberglass, or carbon fiber, the latter being most widely used today. A guard plate is used in clamping the reeds to the reed cage, this guard plate limiting the maximum bending of the reed to help prevent reed damage.

Observation of open carburetors on operating engines using conventional reeds shows considerable blowback at almost all throttle positions and conditions of engine loading. This prompted this action to develop an improved induction valve which would reduce this blowback.

Several modifications in the basic design of these reed valves have been developed. U.S. Pat. No. 4,076,047 to Akahori (1978) describes using a reed petal seat which causes a slight bend in the reed in its closed position, thus creating a pre-load in the reed which aids in sealing. This pre-load in bending, however, causes an increase in the reed pop-off pressure, the pressure which must be applied to the reed to initiate an opening movement. For best operation of a reed valve in admitting mass flow into the engine with minimal entropy increase, it is desirable that this pop-off pressure be minimized. Therefore, in U.S. Pat. No. 4,076,047, an angle between the reed seat and its clamping surface in the range of 1 degree to 3 degrees is described as preferable, this small angle being a compromise between improved sealing and increased pop-off pressure.

Other reed assemblies, such as described in U.S. Pat. No. 2,612,882 to Kiekhaefer (1952), 3,008,459 to Kaufman (1961), and U.S. Pat. No. 4,408,579 to Kusche (1983) show reed valve assemblies for internal combustion engines which use a reed securely mounted to a reed cage or block in which the reed forms an included angle described above of 180 degrees. In other words, the reed seats are positioned such that the plane containing the seats (and the reeds in the closed position) lies essentially perpendicular to the engine induction passage. The tangent lines to the reed ends are therefore co-linear and the included angle is 180 degrees. These seats are also shown as being flat.

U.S. Pat. 5,601,112 to Sekiya et al. (1997) describes a valve which has a moveable sealing member which is flexible and spring-loaded. The open area of the valve and hence the valve flow rate for any pressure across the valve is determined by a combination of translational movement of the disc and flexing of the disc. If the flexibility of the disc material changes with temperature, the operation of the valve will not be uniform at various operating temperatures. Also a stopper is used which blocks a substantial portion of the dynamic pressure associated with a backflow from impacting the disc. Also shown is a disc which is essentially flat across most of its area when in the closed position; this flat portion is not an aerodynamic shape for forward flow and thus impedes forward flow through the valve.

Also, a flow control device called a liquid scroll diode is known in the art which uses no moving parts to provide asymmetric flow characteristics. These diodes provide a flow path which is offset in passing through a circular shaped cavity. The offset is positioned in the cavity to cause minimal flow momentum direction change in a forward direction. The position of the offset, however, together with the circular cavity, causes some backward flow to "scroll" around the circular cavity, ending up with a momentum which is in the opposite direction to which it started, namely against the original flow momentum direction. These scrolling vortices essentially reverse the momentum direction of a portion of the backward flow, directing this reversed momentum against the backward flow. This momentum reversal interferes severely with backward mass flow through the diode, providing the asymmetrical flow characteristic. It was felt that the principles used in these liquid scroll diodes could be applied to an engine induction valve to reduce blowback.

Objects and Advantages

It is an object of this invention to provide an engine induction valve having a moveable sealing member with a curved shape having a convex side facing away from the engine at all operating conditions presenting an aerodynamic surface to incoming mass flow and the opposite concave side always facing the engine to cause a scrolling vortex action to outward flow thereby reducing blowback.

It is a further object of this invention to provide an engine induction valve with a moveable sealing member having an included angle between lines tangent to its ends in the closed position of less than 180 degrees with the angle opening facing toward the engine and its apex pointing away from the engine.

It is a further object of this invention to provide an engine induction valve having a uniform frequency response at various temperatures while using a moveable sealing member made from a material whose elastic modulus changes with temperature.

It is a further object of this invention to provide an engine induction valve having a moveable sealing member mounting which has more than one mounting point but allows volume expansion of the member in all directions.

It is a further object of this invention to provide an engine induction valve which uses a moveable sealing member which is forced to bend against a seat, thereby inducing a stress in the member, but being constructed of a material in which this stress is consequently diminished upon application of a process containing elevated temperature, for instance.

It is a further object of this invention to provide an engine induction valve which uses a moveable member to seal against a curved seat, this curved seat having a decreasing radius of curvature as the distance from a central axis of the member increases.

Still further objects and advantages will become apparent from a consideration of the ensuing description and drawing.

DRAWING FIGURES

Figure 1:
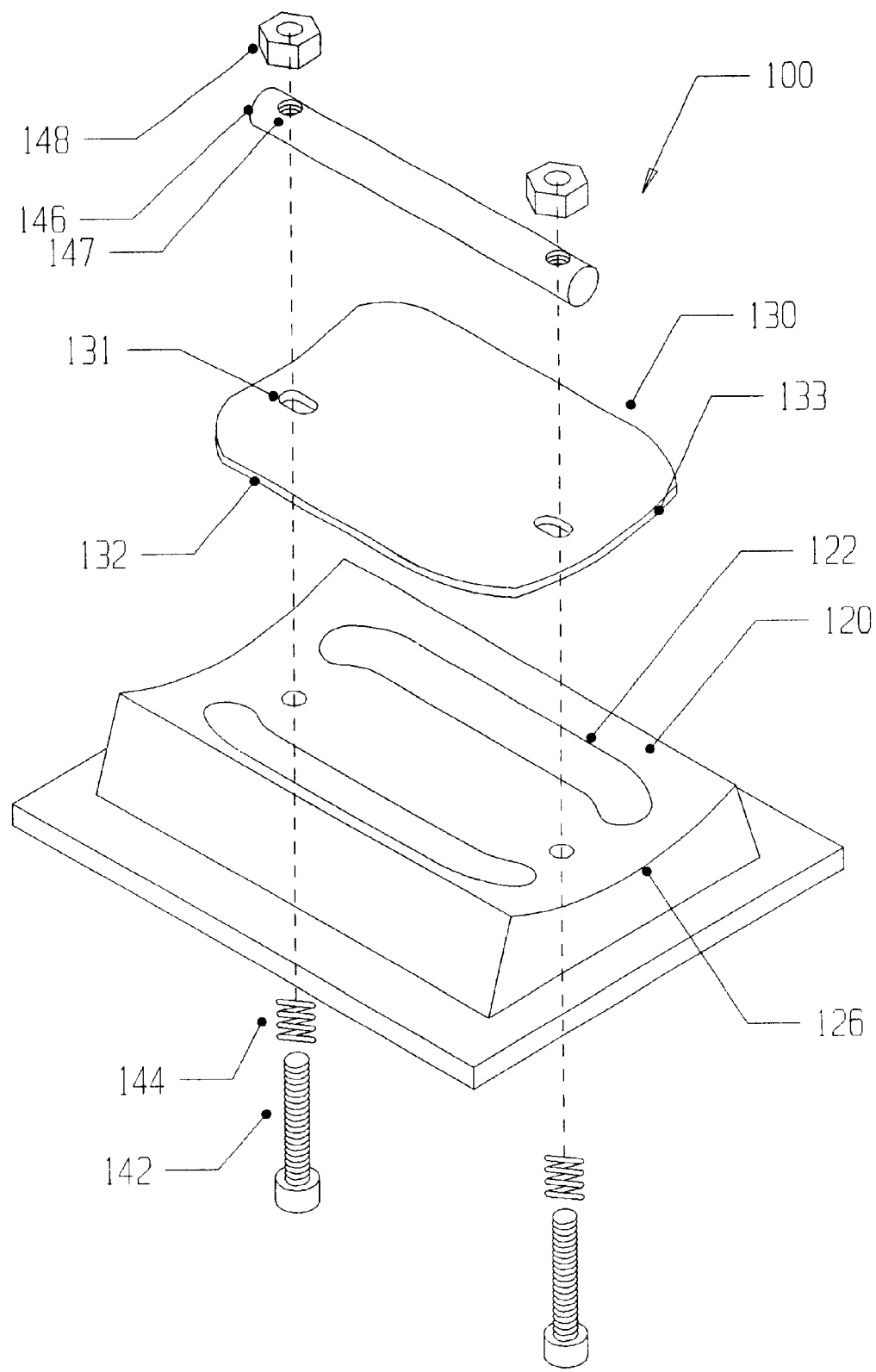
FIG. 1 shows an isometric view of a preferred reed valve embodiment of this invention.
Figure 2:
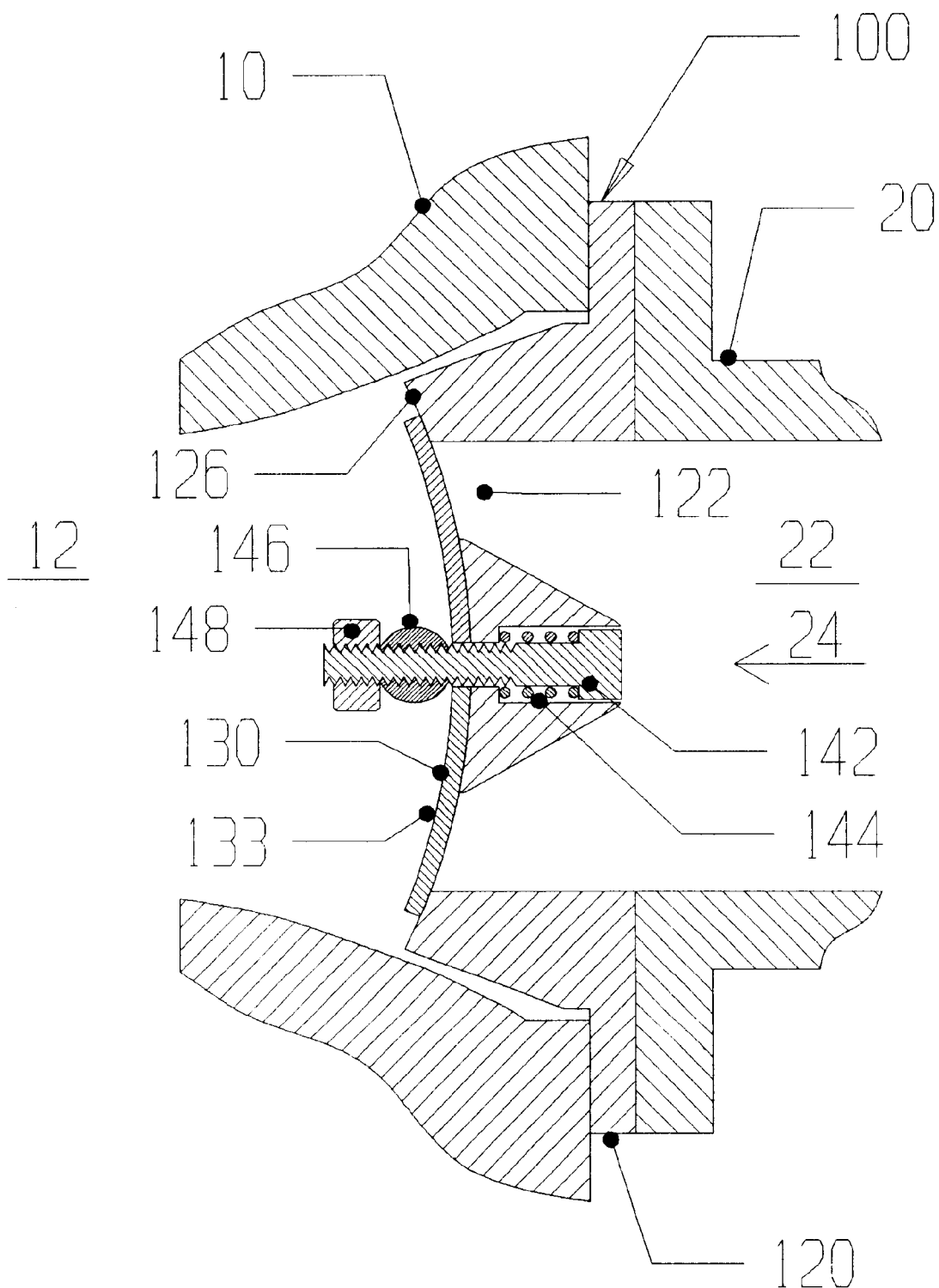
FIGS. 2 and 3 show cross sectional views of this reed valve taken in a plane containing the axis of a reed attachment bolt, FIG. 2 having the reed in the closed position, FIG. 3 having the reed in the open position.
Figure 3:
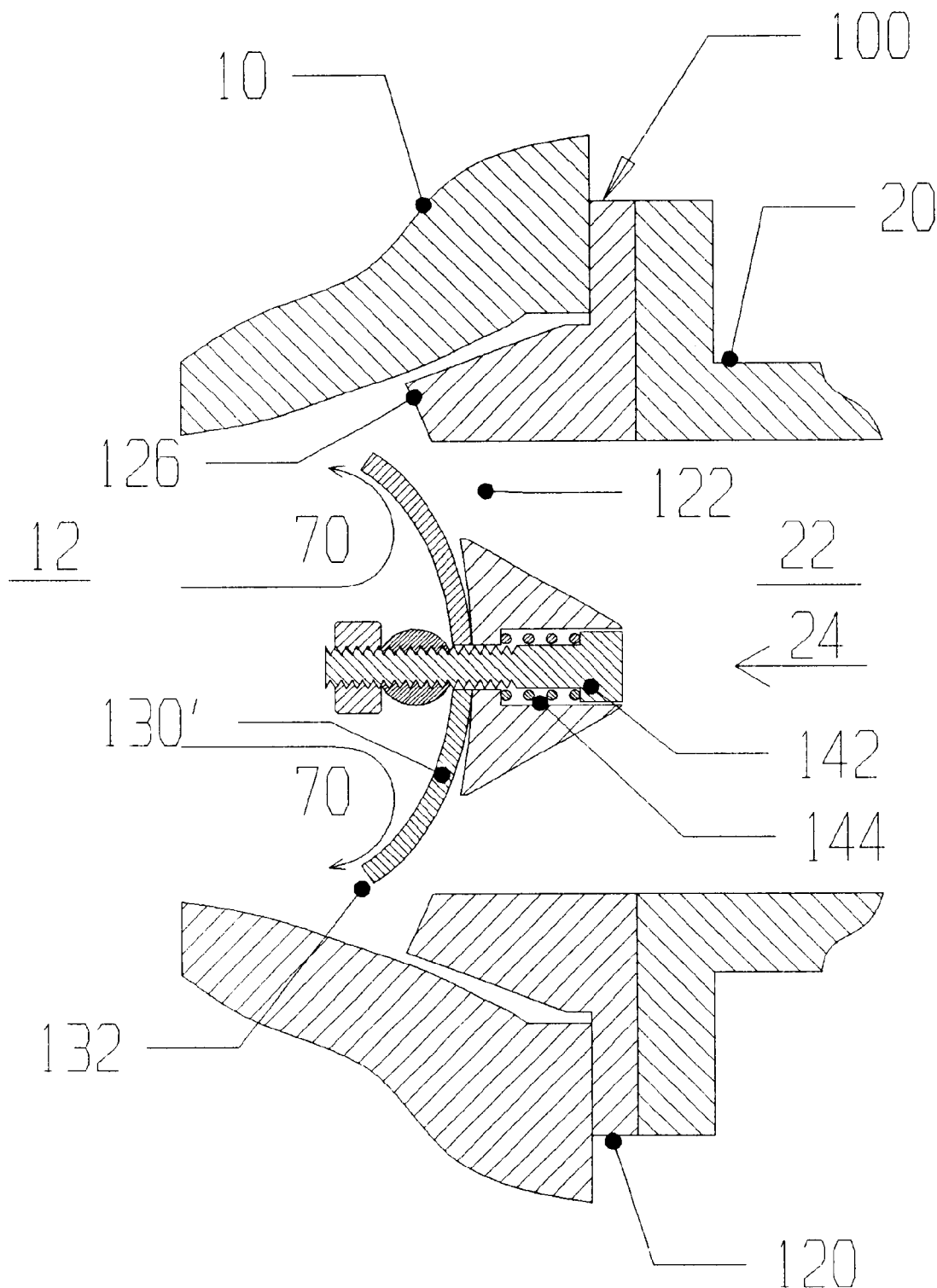

REFERENCE NUMERALS IN DRAWINGS 10 induction valve housing
12 valve housing outlet conduit
20 inlet manifold
22 inlet manifold conduit
24 arrow showing valve inlet flow direction
70 arrow showing reverse flow scroll vortex streamline
100 reed valve assembly
120 reed valve body
122 reed opening
126 reed seat
130 reed petal in closed position
130' reed petal in open position
131 elongated mounting hole
132 reed petal sealing edge
133 reed petal pivot edge
142 mounting screw
144 mounting spring
146 mounting rod
147 mounting rod threaded hole
148 lock nut
200 poppet valve assembly
220 poppet valve body
222 poppet body opening
226 poppet seat
230 moveable sealing member in closed position
230' moveable sealing member in open position
231 elongated mounting hole
232 moveable member primary sealing edge
233 moveable member secondary sealing edge
242 mounting stud
244 control spring
246 guide rod
248 nut Description and Operation—FIGS. 1, 2, and 3

FIGS. 1, 2, and 3 show a reed valve assembly 100 of this invention. Reed assembly 100 is normally clamped between an induction valve housing 10 and an inlet manifold 20 using a suitable clamping means (not shown). Valve housing 10 is normally cast as part of an engine (not shown) and contains an outlet conduit 12 which transfers the mass which has passed through valve 100 into the engine. Inlet manifold 20 is normally a metal or rubber member which connects reed assembly 100 to a throttle body or carburetor (not shown) and contains an inlet conduit 22. Inward mass flow direction is shown by direction arrow 24; streamlines of reverse air flow scroll vortices are shown illustratively by arrows 70.

Assembly 100 contains a body 120 normally machined or cast from a metal such as aluminum or a plastic such as acetal or nylon. Body 120 has an opening 122 in a seat 126, seat 126 having a preferred contour.

A reed petal in a closed position is shown as 130; a reed petal in an open position is shown as 130'. Petal 130 contains an elongated mounting hole 131, a sealing edge 132, and an edge generally perpendicular to sealing edge 132 called a pivot edge 133.

Reed 130 is positioned relative to body 120 using screws 142, springs 144, a mounting rod 146 with threaded holes 147, and optional lock nuts 148. Reed 130 as it opens to reed 130' bends and pivots against rod 146 creating the reed action.

Operation of FIGS. 1, 2, and 3 is as follows. Reciprocating motion of a piston in the engine creates pressure pulses in the engine crankcase, these pressure pulses resulting in a pressure difference across reed valve assembly 100. When the engine piston is on its upward stroke, a reduced pressure appears in outlet conduit 12 relative to the pressure existing in inlet conduit 22. Once this pressure difference exceeds the reed's pop-off pressure, this pressure difference causes reed petal 130 in the closed position against seat 126 to move away from seat 126 and eventually move to an open position shown as reed petal 130'. Shortly after the engine piston begins its descent on the power stroke, the pressure in outlet conduit 12 rises relative to the pressure in inlet conduit 22. This change in pressure difference, aided by the bending stress existing in reed petal 130', causes petal 130', to move toward seat 126 eventually effectively sealing opening 122. The movement of petal 130', to seat 126 essentially prevents further mass escape, or blowback, out of the engine crankcase. This description describes the operation of reed assembly 100 and is similar to the operation of conventional reed assemblies.

Several parameters affect reed valve operation in allowing relatively unrestricted mass inflow to the engine but relatively restricted outflow. Aerodynamic considerations for the reed assembly are very important; reed operation will be improved if it has good aerodynamic properties in the forward direction, but poor aerodynamic properties in the reverse direction. Other considerations involve the reed itself; the density and elastic modulus of the material, and the thickness and length of the reed from its pivot point. A mass flow system which allows mass flow with small entropy increase can be said to have good aerodynamic properties; a system which causes relatively large entropy increase can be said to have poor aerodynamic properties. A valve which has poorer aerodynamic flow properties into an engine and/ or better aerodynamic flow properties out of an engine will cause an engine to lose power.

Conventional reeds presently used, namely reeds with their included angle facing away from the engine, are fairly aerodynamic in the forward direction, the inside of the reed "tent" collecting or "funneling" the incoming mass and directing it toward the reed opening for smooth flow into the engine. Conventional reeds are actually also fairly aerodynamic in the reverse direction, however, which is not desirable. When conventional reeds are in the open position, there is a direct path for mass flow through the open reed in the backward direction, and the flow relatively easily adjusts to exit through the reed opening as it travels out of the engine crankcase. Some of the outward mass flow, however, "misses" the reed opening, pressurizing the area between the open reed and the reed housing. The area between the open reed and the reed housing is essentially a "dead end street". The mass stream which passes the open end of the conventional reed passes into this "dead air" space where essentially all its momentum is lost and not reversed. The momentum of the mass which has missed the reed end has therefore minimal effect in reducing backflow.

Reed assembly 100 of this invention has good aerodynamic properties in the forward direction, even with the reed having an included angle which faces the engine. The inward flow aerodynamic properties associated with the curved surface of reed 130 (and 130') are better than those existing with a flat surface. Dynamometer testing has shown that this shape flows well due to the fact that there is essentially no loss in engine power with reed assembly 100 compared to a conventional reed assembly.

Reed assembly 100 has poor aerodynamic flow characteristics in the reverse direction, this being desirable. As mentioned above, observing open carburetors on a running engine shows considerable blowback when using conventional reed assemblies. The open carburetors on a twin cylinder engine have been observed while run on a dynamometer with a conventional reed installed on one cylinder and a reed assembly similar to assembly 100 of this invention on the other cylinder. It was observed that while there was little or no decrease in horsepower compared to the same engine run with two conventional reeds, the carburetor containing the reed assembly similar to assembly 100 had minimal blowback at any throttle position or engine loading, but the carburetor with the conventional reed installed had significant blowback at almost all conditions.

It is felt that this reduction in blowback is partially the result of the scroll vortex effect described above. Open reed petal 130'(and even its eventual change to closed reed 130) in FIG. 3 is shown to have the ability to create this same circular vortex to impede mass outflow from the engine through reed assembly 100. When the pressure in conduit 12 is greater than the pressure in conduit 22, mass flow in conduit 12 is in a direction toward reed petal 130', namely away from the engine. Even a relatively short distance from petal 130', the flow is fairly uniform across the area of conduit 12. Due to the fact that the opening at sealing edge 132 of reed petal 130', is offset relative to the center of conduit 12 and due to the momentum or dynamic pressure of the moving mass in conduit 12, there is a tendency for some of the mass to impinge upon the concave engine side of reed petal 130', and "scroll" due to the curved shape of petal 130', creating a flow streamline shown by arrow 70. This scrolling mass flow leaves sealing edge 132 of reed petal 130', shown by the end of arrow 70. The direction of the momentum of this mass flow at the end of arrow 70 has a component which is reversed from that existing in conduit 12, this reversed momentum opposing mass flow past sealing edge 132 thereby reducing blowback. In other words, the shape of reed assembly 100 performs similarly to a scroll liquid diode in that the flow path in the backward direction is offset, a portion of the backward flow contacts a curved surface, namely the concave engine side of reed 130', causing this flow portion to "scroll", interfering with and limiting reverse mass flow past sealing edge 132 of open reed 130'.

It is also important to note that this scroll effect which reduces backflow is most effective if the backward flow momentum, or dynamic pressure, is able to directly impinge on the back side of moveable member 130'. This enables the scroll to exit near sealing edge 132 where it is most effective in reducing backflow past this edge. The presence of a stopper, a fixed member which prevents excessive movement of reed 130', would interfere with the dynamic pressure associated with this backflow from impinging on reed 130'. It is conceivable that a stopper could be designed with its own curved surface to create a scrolling effect, but due to the fact that it is fixed, would only be most effective in reducing backflow when reed 130', was in the fully open position and edge 132 was adjacent to the stopper. At other partially open positions, edge 132 would be spaced away from the edge of the stopper which is causing the scrolling, and therefore its beneficial effect would be diminished. Therefore, it can be seen that reed 130', of assembly 100 provides in essence a moveable "scrolling edge", namely sealing edge 132, which has maximum benefit in reducing backflow past itself. A fixed stopper which prevents a substantial portion of the backward dynamic pressure from impinging on member 130', would also slow down the closing of member 130', to position 130. This is due to the diminished closing force on member 130', due to the loss of the dynamic pressure impact on 130', caused by the shielding effect of a fixed stopper.

This design did present some obstacles which had to be overcome. It is preferable to design reed assembly 100 to fit into existing valve housings 10 to enable replacement of conventional reed assemblies. Therefore the length of pivot edge 133 of reed 130 is limited by the existing space available. One-half the length of pivot edge 133, which can be called the pivot length of reed 130, considered in relation to the movement away from seat 126 of sealing edge 132, determines the average radius of curvature required in open reed 130', required for sufficient mass flow past edge 132. Conventional reeds, primarily because of the orientation of their included angles and the fact that they are clamped at the base of the reed cage "tent", have pivot lengths in the range of 38 mm (1.5 inches); the pivot length of reed 130', of assembly when installed in an existing reed housing 10 is limited to a length of approximately 19 mm (0.75 inches). Therefore, to achieve a similar opening area for mass flow past sealing edge 132, reed 130 of this invention must deflect to a smaller average radius of curvature than that required for a conventional reed.

As mentioned earlier, existing reeds used today primarily use carbon fiber in their construction, other materials being fiberglass and stainless steel. These materials are relatively rigid and would excessively fatigue or actually break when bent in the small radius required in assembly 100. A material with the elastic properties of a rubber, in other words a material having a Poisson's ratio (the ratio between the strain perpendicular to an applied stress and the strain parallel to the stress) in the range of 0.4 to 0.8 is desirable for this application because of its ability to be repeatedly bent to a relatively small radius of curvature.

A material which worked well for this reed assembly 100 was polyurethane having a durometer of 90 Shore A and a thickness of 1.5 mm (0.06 inches). This material has a low specific gravity, about 1.1, a relatively high tensile strength, good abrasion resistance, and long life under continuous flexing.

Another problem which arose when using this material was its thermal expansion and expansion caused by impregnation when exposed to elevated temperatures in the presence of fuel and lubricating oil. This expansion was found to be in the range of about 5%. When a reed 130 made from polyurethane was rigidly clamped by mounting rod 146 to body 120 and subsequently exposed to elevated temperature in the presence of fuel and oil, reed 130 permanently buckled, especially at sealing edge 132; it couldn't easily lengthen due to the rigid clamping. This buckling prevented reed 130 from effectively sealing against seat 126 and the operation of valve 100 was impaired.

The solution to this problem was to spring load attachment screws 142 using mounting springs 144 and to use elongated holes 131 in reed 130 for the penetration of screws 142 through member 130 as shown in FIG. 1. By adjusting the torque on screws 142, springs 144 were set with a sufficient initial load to hold and position reed 130 against body 120 but, with elongated holes 131, still allowed reed 130 to lengthen, thereby preventing the buckling described above.

Testing and computer simulations of this system indicate that in all cases it is desirable to minimize the pre-load on reed 130 consistent with satisfactory sealing. In other words it is beneficial to minimize the pop-off pressure of reed 130. The reed design of this invention shown in FIGS. 1,2, and 3 at first inspection would indicate that its pop-off pressure would be relatively high. The pop-off pressure of reed 160, using a reed made of the above mentioned material and which is initially flat, does exhibit a relatively high pop-off pressure when first installed against curved seat 126. A reed assembly similar to assembly 100 with an initially flat "new" polyurethane reed was tested for power on an engine, and there was a power decrease compared to that obtained with conventional reed assemblies on the same engine.

It was found, however, that after repeated operation and heat soaking in the presence of fuel, engine power increased. Also, after removal of this "used" reed from body 120, it had stress-relieved, taking a set. Reed 130 after removal from body 120 had approximately the shape of seat 126, having only slightly less curvature than seat 126 after removal. This stress relief, therefore, would also mean a decrease in pop-off pressure with the consequent improvement in engine power. It should be noted that this stress relief can occur in service, or reed 130 can be pre-set by application of a suitable process such as bending and subjection to elevated temperature (in the presence of a suitable solvent if desired).

A seat 126 shape which worked particularly well, especially for a reed which took a set, was a curve whose radius of curvature became progressively less as the dimension from mounting rod 146 along pivot edge 133 increased. This helped insure that the primary sealing edge of reed 130, namely edge 132, sealed against seat 126 in the closed position. A curve that fits this description of course is an ellipse An elliptically curved seat 126 is easily obtained by machining body 120 using an inclined circular mill. A suitable seat 126 was milled into body 120 for a valve similar to assembly 100 by clamping body 120 horizontally in a mill and machining with a mill of diameter 80 mm (3.15") with its axis inclined at an angle of 40 degrees to vertical.

Lines tangent to reed 130 near opposite edges 132 which define the end of the curve in reed 130 establish the included angle for this design. Using the seat and reed pivot length described above, this yielded an included angle for closed reed 130 of approximately 140 degrees. This included angle has its opening toward the engine and its apex pointing away from the engine. This included angle of course progressively decreased as reed 130 bent to reed 130', attaining an included angle of approximately 120 degrees at an open position.

Figure 4:
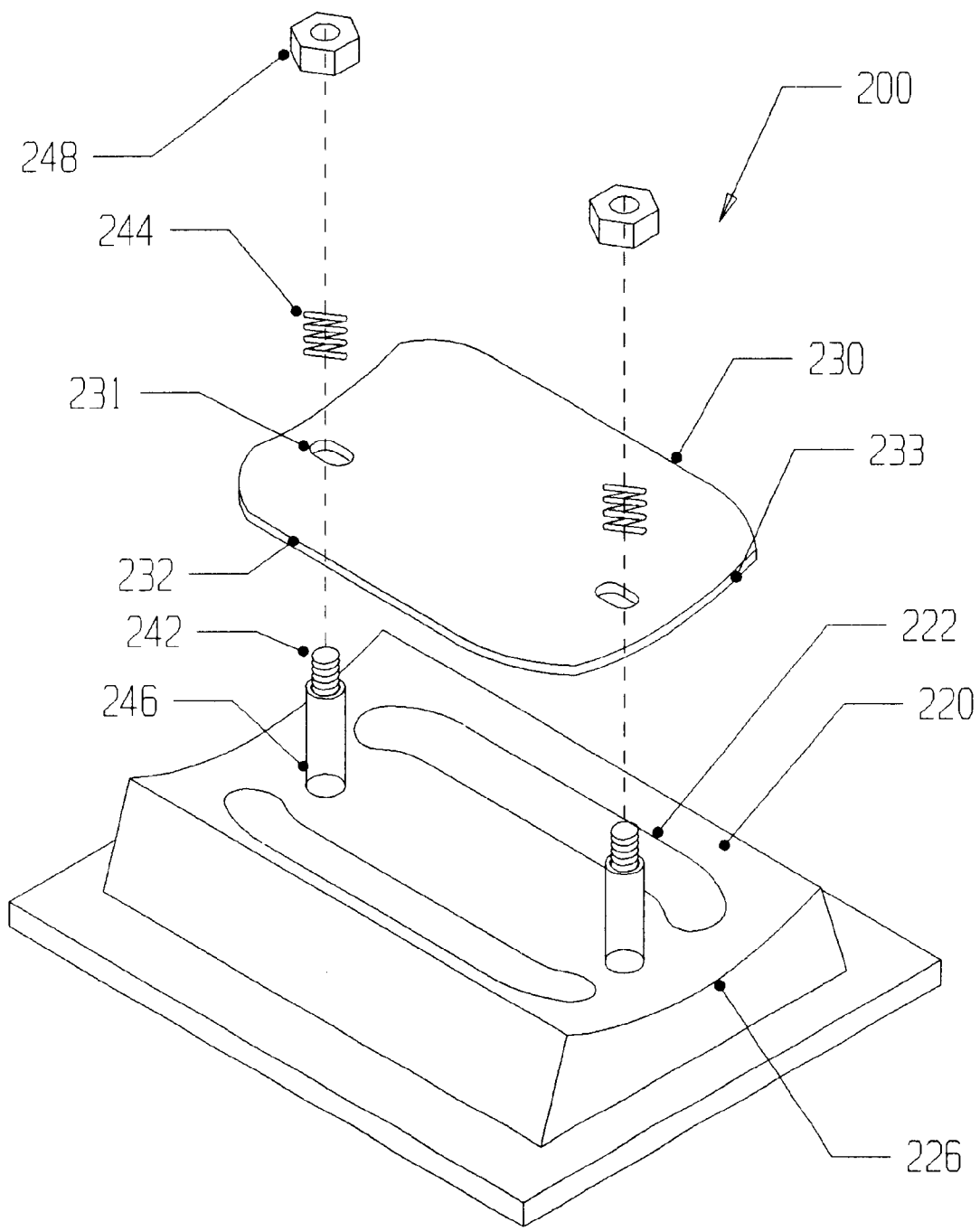
FIG. 4 shows an isometric view of a preferred poppet valve embodiment of this invention.
Figure 5:
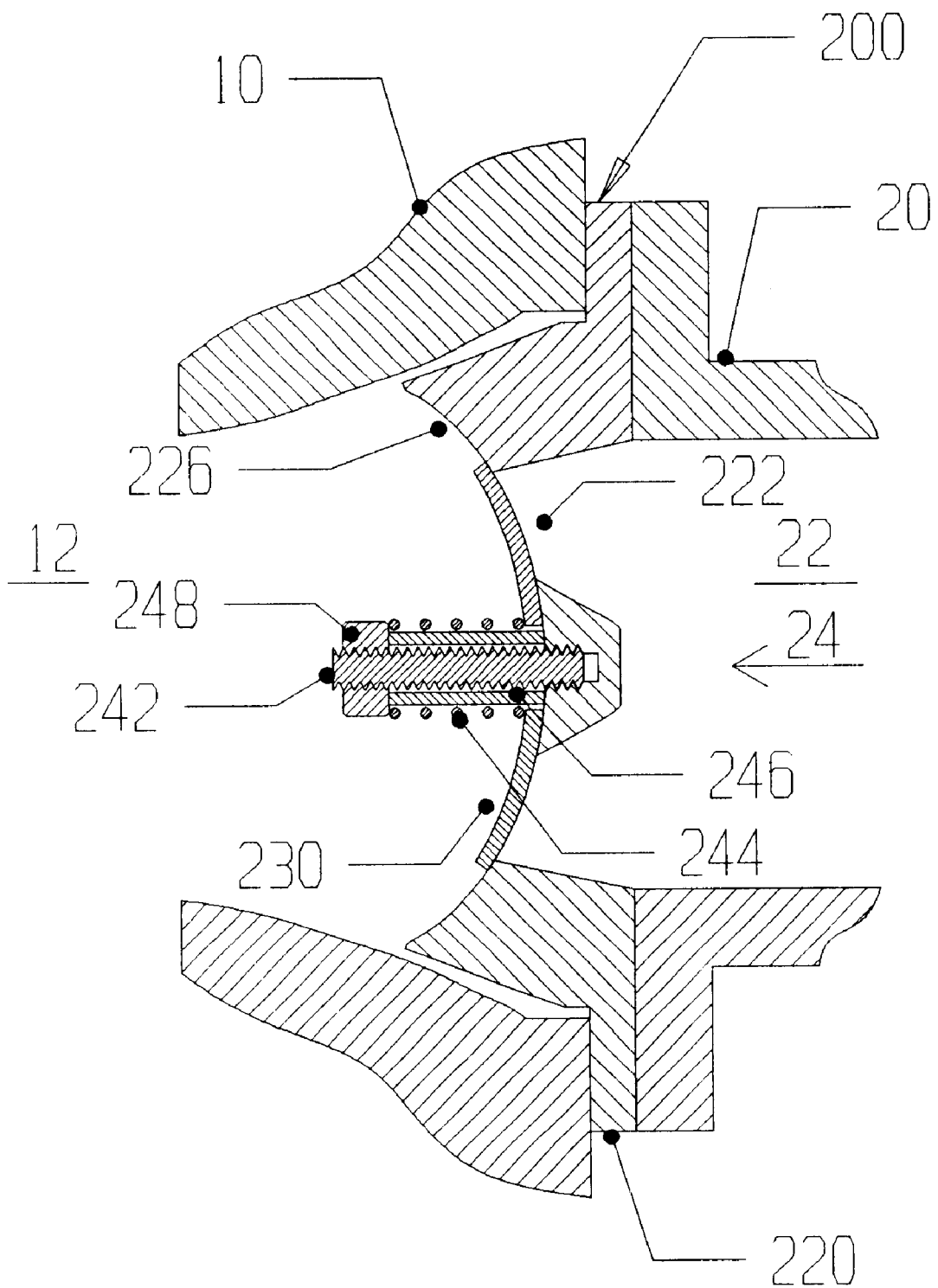
FIGS. 5 and 6 show cross sectional views of this poppet valve taken in a plane containing the axis of a mounting stud, FIG. 5 having the moveable member in the closed position, FIG. 6 having the member in the open position.
Figure 6:
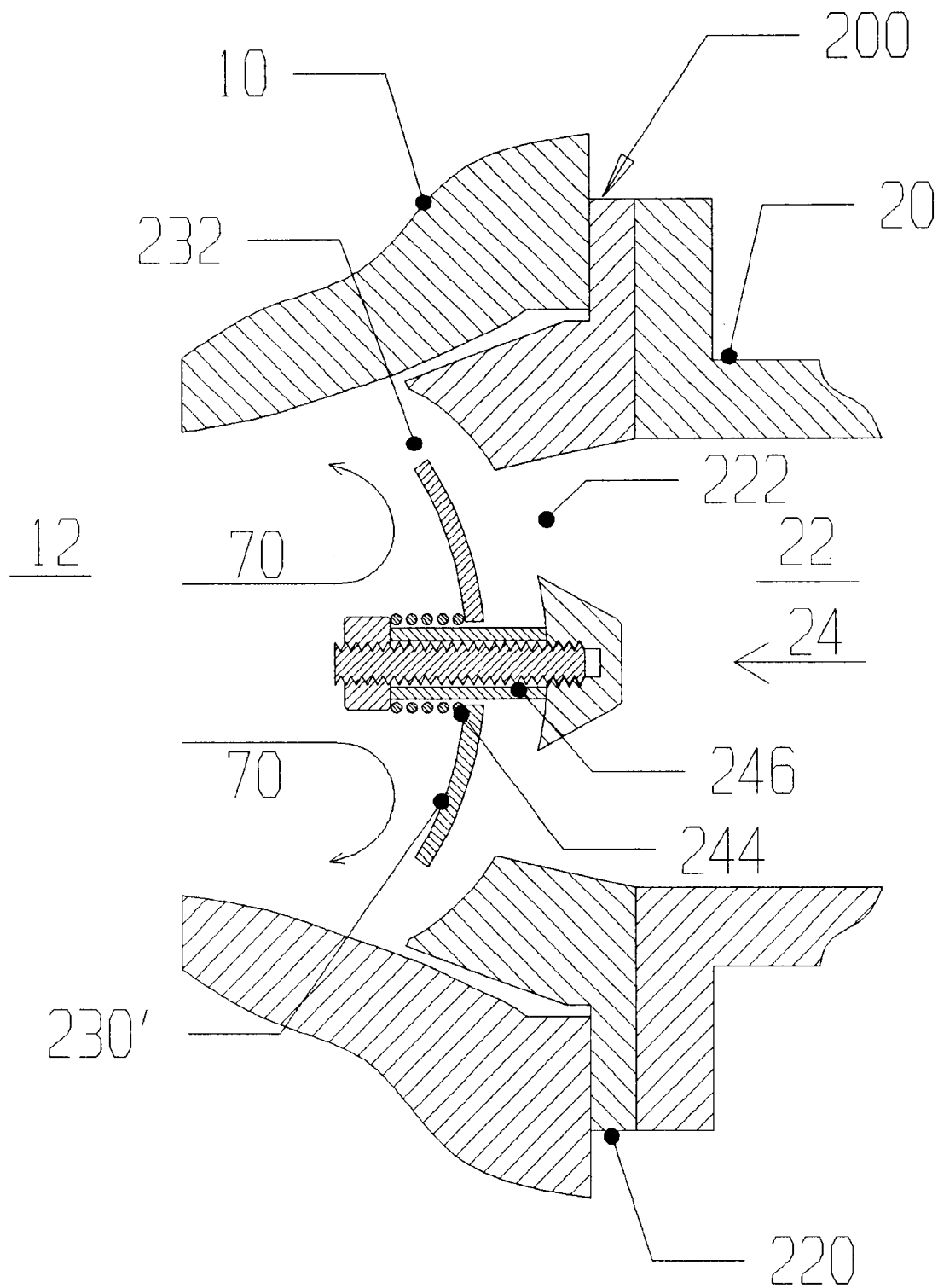

Description and Operation—FIGS. 4, 5, and 6

FIGS. 4, 5, and 6 show a poppet valve assembly 200 of this invention. Poppet assembly 200 is normally clamped between an induction valve housing 10 and an inlet manifold 20 using a suitable clamping means (not shown). Valve housing 10 is normally cast as part of an engine (not shown) and contains an outlet conduit 12 which transfers the mass which has passed through valve 200 into the engine. Inlet manifold 20 is normally a metal or rubber member which connects assembly 200 to a throttle body or carburetor (not shown) and contains an inlet conduit 22. Inward mass flow direction is shown by direction arrow, 24; streamlines of reverse air flow scroll vortices are shown illustratively by arrows 70.

Assembly 200 contains a body 220 normally machined or cast from a metal such as aluminum or a plastic such as acetal or nylon. Body 220 has an opening 222 in a seat 226, seat 226 preferably having an elliptical contour.

A moveable sealing member in a closed position is shown as 230; in an open position it is shown as 230'. Member 230 contains elongated mounting holes 231, a primary sealing edge 232, and an edge generally perpendicular to sealing edge 232 called secondary sealing edge 233. Moveable sealing member 230 is positioned relative to body 220 using studs 242, springs 244, guide rods 246, and nuts 248.

Operation of FIGS. 4, 5, and 6 is similar to the operation of reed assembly 100. As in assembly 100, reciprocating motion of the engine piston causes pressure differences to appear across assembly 200. When the pressure in outlet conduit 12 is less than the pressure in inlet conduit 22, member 230 is urged to compress springs 244, moving along guide rods 246 away from seat 226 thereby allowing mass flow through opening 222. In this case, the pop-off pressure valve 200 is primarily determined by the initial set-up force in springs 244; once this pop-off pressure is exceeded, movement of member 230 occurs. When the pressure in outlet conduit 12 increases relative to the pressure in inlet conduit 22, the force built up in compressed springs 244 along with the force on moveable member 230' due to static and dynamic pressure acting on it, moves member 230' along guide rods 246 toward seat 226, eventually contacting seat 226 and effectively sealing opening 222.

Poppet assembly 200, like reed assembly 100, has good aerodynamic properties in the forward direction, enabled in part to the initial bend, or curve, in member 230. This initial bend over the entire surface of member 230 will make assembly 200 possess better forward aerodynamic properties than a similar poppet valve having a portion of its surface flat. These good aerodynamic properties exist at all positions of member 230.

Assembly 200, like assembly 100, has poor reverse flow aerodynamic properties. Poppet valves similar to assembly 200 were run on an engine; blowback quantity was observed to be minimal compared to conventional reed valves with essentially no loss in engine power. Like assembly 100, this improved performance of assembly 200 is believed to partially be attributable to the scrolling of the reverse air flow shown by arrows 70 in FIG. 6. As in assembly 100, the engine side of valve 200 is designed without any stoppers or baffles to hinder backward mass flow momentum and its associated dynamic pressure from impinging on the engine side of member 230. This allows the scrolling action shown by arrow 70 to occur near edge 232, thereby being most effective in reducing backward mass flow past edge 232. Edge 232, like edge 132 in assembly 100, is a moveable "scrolling edge".

In testing reed assemblies similar to assembly 100, increased blowback was observed when reed 130 was hot. This is caused by a reduction at elevated temperatures in the elastic modulus of the polyurethane used to construct reed 130. This reduction in elastic modulus makes reed 130 more flexible, reduces the natural frequency of the reed, and consequently lowers the frequency response of the valve, thereby allowing more blowback.

In assembly 200 an essentially constant frequency response was obtained by making moveable member 230 "stiff" relative to the total spring rate of springs 244. This was obtained primarily by three methods. First, a polyurethane of a higher durometer, namely 95 Shore A, was used compared to the 90 durometer used in reed assembly 100. This higher durometer material has a higher elastic modulus thereby making member 230 stiffer in bending. Another change was to make the length of secondary sealing edge 233 in member 230 shorter than the length of pivot edge 133 of reed 130. This shorter length also makes member 230 stiffer in bending along edge 233 than petal 130 in bending along edge 133. Minimizing the total moving mass in assembly 200, principally the mass of member 230, also minimizes the spring rate of springs 244 for any given frequency response, also helping make them relatively weak compared to the flexibility of member 230. Using these design considerations in a valve similar to assembly 200 there was no noticeable difference in frequency response of the valve at various operating temperatures for any spring rate value selected for springs 244.

Moveable member 230 has an essentially rectangular shape, and it is therefore necessary that the angular orientation of 230 relative to body 220 by maintained correctly to insure proper closing of opening 222 by member 230. Since member 230 is not rigidly clamped to body, more than one coupling point is required to maintain the proper orientation. Member 230 was provided with two holes to allow two guide rods 246 to penetrate member 230. Moveable member 230 of assembly 200, because of its spring 244 mounting, its frequent movement from seat 226, and its elongated holes 231, also overcomes the problem of buckling caused by volume swell of member 230 even though multiple mounting points are used. Furthermore, it has been found that elongated holes 231 can be replaced with sufficiently oversized round holes relative to the diameter of guide rods 246, and can be further improved if these holes are located such that their position is correct relative to guide rods 246 after normal swelling of member 230 has occurred. It was also found that due to the good abrasion resistance of the polyurethane used in member 230, no bushings in holes 231 were required; holes 231 in the polyurethane were their own bushings.

Member 230 of assembly 200 was designed to have minimum bending due to opening pressure compared to reed petal 130 of assembly 100. Therefore, to insure improved aerodynamic properties in the forward direction, seat 226 was designed to have a smaller average radius of curvature than that used in seat 126 of assembly 100. This was accomplished by using a milling cutter having a smaller diameter than that used for seat 126 of assembly 100. A suitable seat 226 was milled into body 220 for a valve similar to assembly 200 by clamping body 220 horizontally in a mill and machining with a mill of diameter 48 mm (1.9") with its axis inclined at an angle of 45 degrees to vertical. Using the seat described above with a length for secondary sealing edge 233 of 34mm (1.3"), this gave an included angle for member 230 of approximately 110 degrees. This included angle has its opening facing toward the engine and its apex pointing away from the engine.

Summary, Ramification, and Scope

Accordingly, the reader will see that this invention provides an engine induction valve which is an effective replacement for conventional reed valves which, partially due to a curve in its moveable member, provides a reduction in engine blowback while delivering essentially equal engine power. Proper spring selection and moveable member shape and material selection allow this valve to maintain an essentially uniform frequency characteristic even if the moveable member material changes stiffness with temperature change. Proper spring loaded attachment of the moveable body to the valve body allows expansion of the moveable member without buckling. Construction of the moveable member from a material. which takes a set after exposure to a combination of heat and fuel allows the member to be significantly bent to improve the aerodynamic characteristics of the valve while maintaining a low pop-off pressure.

Although the description above contains many specificities, these should not be construed as limiting the scope of the invention but as merely providing illustrations of some of the presently preferred embodiments of this invention. For instance, O-rings have successfully been used for the mounting springs in the reed embodiment of this invention. Also, discussed here is a reed embodiment where the moveable member acts like a reed and moves only in flexing, and a poppet embodiment where the moveable member moves essentially only in translation. A combination of these two embodiments is possible where both moveable member flexing and translation are important in the valve operation. Also, even though the moveable member in either the reed or poppet valve embodiment is described as one piece of material, there could be some instances where manufacture of the moveable member in several pieces may be desirable, which could still fall under the essence of this invention. Thus, the scope of the invention should be determined by the appended claims and their legal equivalents, rather than by the examples given.

I claim:

1. A valve for mass flow control in an induction tract of an internal combustion engine, said engine induction tract including:
   a first direction of said mass flow toward said engine,
   a second direction of said mass flow away from said engine,
   a first pressure urging said mass flow in said first direction toward said engine,
   a second pressure urging said mass flow in said second direction away from said engine, said valve including:
      a body with a seat having a curved surface,
      a moveable member which has a closed position which effectively closes said valve when operationally covering said seat but which is able to move away from said seat in response to
      said first pressure to open said valve,
      said moveable member having a curved shape,
      said curved shape having a first side which is always convex and a second side which is always concave,
      an attachment means which is effective in positioning said moveable member relative to said body and said seat,
      wherein said first convex side always faces away from said engine and wherein said curve in said first convex side is always effective in creating good aerodynamic mass flow properties in first direction toward said engine,
      and wherein said second concave side always faces toward said engine and is always effective in reducing said mass flow in said second direction away from said engine.

2. The valve of claim 1, wherein said moveable member has a first shape which can be deformed by a force into a second shape and can return to essentially said first shape after removal of said force, and wherein said moveable member has said first shape, is deformed by said force into said second shape, is subjected to a process, and after removal of said force has a third shape distinctly different from said first shape.

3. The valve of claim 2, wherein said process includes application of elevated temperatures.

4. The valve of claim 2, wherein said process includes the application of a fuel of said engine.

5. The valve of claim 2, wherein said process includes operation in said induction tract of said engine.

6. The valve of claim 2, wherein said moveable member is made from polyurethane.

7. The valve of claim 2, wherein said second shape is the shape of said moveable member when in said closed position, and wherein said valve has a first magnitude of said first pressure which causes said moveable member in said second shape before application of said process to move incrementally from said closed position, a second magnitude of said first pressure which causes said moveable member in said second shape after application of said process to move incrementally from said closed position, and wherein said first magnitude is operationally greater than said second magnitude.

8. The valve of claim 2, wherein said attachment means penetrates said moveable member in multiple locations, and wherein said attachment means has an operationally effective spring rate to limit the force between said moveable member and said body allowing operationally effective movement of said moveable member in all directions thereby preventing detrimental buckling of said moveable member after application of an operationally possible process.

9. The valve of claim 1, wherein said mass flow in said second direction away from said engine has a momentum in said second direction and is effective in applying dynamic pressure to said second side of said moveable member which is always concave and always facing toward said engine, and whereby said second side of said moveable member which is always concave and always facing toward said engine is effective in causing reversal of a portion of said momentum in said second direction to a momentum having a component in said first direction toward said engine, whereby said mass flow in said second direction away from said engine is impeded.

10. The valve of claim 9, wherein an operationally effective portion of said mass flow in said second direction away from said engine impacts said second side of said moveable member which is always concave and always facing toward said engine and wherein said effective portion of said mass flow in said second direction consequently contains streamlines which are scroll vortices located near an edge of said moveable member thereby impeding said mass flow in said second direction away from said engine past said edge of said moveable member.

11. The valve of claim 10, wherein said streamlines which are scroll vortices operationally move in response to movement of said moveable member.

12. The valve of claim 1, wherein said moveable member has a flexibility, said attachment means has an operationally finite spring rate, and wherein said flexibility in said moveable member is effective in determining movement of said moveable member in response to said first pressure and wherein said spring rate of said attachment means is operationally ineffective in determining said movement.

13. The valve of claim 1, wherein said moveable member has a flexibility, said attachment means has a spring rate, and wherein said flexibility in said moveable member is operationally ineffective in determining movement of said moveable member in response to said first pressure and wherein said spring rate of said attachment means is effective in determining said movement.

14. The valve of claim 1, wherein said moveable member has a flexibility, said attachment means has a spring rate, and wherein said flexibility in said moveable member and said spring rate of said attachment means are effective in determining movement of said moveable member in response to said first pressure.

15. A valve for mass control in an induction tract of an internal combustion engine, said valve including:
   a body with a seat having a curved surface,
   a moveable member which effectively closes said valve when operationally covering said seat but which is able to move away from said seat in response to said first pressure to open said valve,
   said curved surface in said seat having a first radius of curvature near a central axis of said moveable member and a second radius of curvature near an edge of said moveable member, wherein said first radius of curvature is greater than said second radius of curvature.

16. The valve of claim 15, wherein said curved surface in said seat contains a segment of an ellipse.

17. The valve of claim 1, wherein said moveable member has an included angle defined by two lines tangent to surfaces of said moveable member at opposite edges which define the ends of said curved shape of said moveable member, the value of said included angle being less than 180 degrees and wherein said included angle opens toward said engine and said included angle has its apex pointing away from said engine.

18. The valve of claim 17, wherein said included angle has a value between 50 and 150 degrees.

19. A valve for mass flow control in an induction tract of an internal combustion engine, said engine induction tract including:
   a first direction of said mass flow toward said engine,
   a second direction of said mass flow away from said engine,
   a first pressure urging said mass flow in said first direction toward said engine,
   a second pressure urging said mass flow in said second direction away from said engine,
   said valve including:
      a body with a seat,
      a moveable member which effectively closes said valve when operationally covering said seat but which is able to move away from said seat in response to said first pressure to open said valve,
      an attachment means which is effective in positioning said moveable member relative to said body and said seat,
      said moveable member having a flexibility,
      said flexibility in said moveable member being effective in determining movement of said moveable member,
      said attachment means being ineffective in determining said movement of said moveable member,
      said moveable member having an included angle defined by lines tangent to said moveable member near opposite edges of said moveable member, the value of said included angle being less than 180 degrees,
      and wherein said included angle opens toward said engine and said included angle has its apex pointing away from said engine.

20. The valve of claim 19, wherein said included angle has a value between 50 and 150 degrees.

* * * * *